United States Patent Office 3,105,085
Patented Sept. 24, 1963

3,105,085
BISSILYLCYCLOHEXADIENES, THEIR
PREPARATION AND USE
Louis H. Toporcer, Midland, Mich., assignor to Dow Corning Corporation, Midland, Mich., a corporation of Michigan
No Drawing. Filed July 21, 1961, Ser. No. 125,660
9 Claims. (Cl. 260—448.2)

This invention relates to new compositions, i.e. 3,6-bis(tri-substituted-silyl)cyclohexadienes-1,4, and a novel method of preparing these compounds. This invention also relates to a method utilizing these new compounds.

This application is a continuation-in-part of my co-pending application Serial No. 75,138, filed December 12, 1960, now abandoned.

More specifically, this invention relates to compositions of the general formula

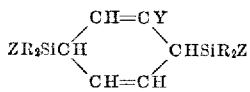

in which each R is an alkyl radical or a cycloalkyl radical, Y is a hydrogen atom, an alkyl radical of less than about five carbon atoms or an alkoxyl radical of less than about five carbon atoms, and each Z is an —R radical, an —OR radical, a hydroxyl radical, a hydrogen atom or a halogen atom.

In the compositions of this invention R can be any alkyl or cycloalkyl radical such as, for example, the methyl, ethyl, isopropyl, t-butyl, n-butyl, 2-ethylhexyl, dodecyl, octadecyl, myricyl, cyclopentyl and cyclohexyl radicals. Preferably each R is a methyl radical.

Y can be a hydrogen atom or a methyl, ethyl, n-propyl, isopropyl, n-butyl, sec-butyl or tert-butyl radical. In addition Y can be a methoxyl, ethoxyl, n-propoxyl, isopropoxyl, n-butoxyl, sec-butoxyl or tert-butoxyl radical.

Z can be any —R radical. Z can also be an —OR radical in which R is as defined above, but preferably such an —OR radical is an alkoxyl radical of less than about five carbon atoms, e.g. the methoxyl, ethoxyl and t-butoxyl radicals. Z can be a hydroxyl radical, hydrogen atom or any halogen atom, i.e. fluorine, chlorine, bromine and iodine, preferably chlorine.

The compositions of this invention are prepared by reacting a halogenosilane of the formula $SiR_2AX$ in which R is as defined above, A is the same as Z except that A cannot be a hydroxyl radical and X is a halogen atom with benzene, substituted or not, i.e. $C_6H_5Y$, in contact with an alkali metal and any of certain ethers free of aliphatic unsaturation. The reaction takes place at room temperature. The desired product can be isolated by distillation if desired.

Any alkali metal is operative. Since the reaction involved apparently takes place at the alkali metal surface, the alkali metal is usually added as a free metal or a suspension of free metal in some solvent soluble solid or liquid. For use as a free metal lithium is preferred. However, sodium, potassium and the like are effective as free metals especially when used in conjunction with a little lithium or lithium salt, e.g. lithium chloride. Fluid alloys such as that corresponding to the formula $Na_2K$ are also especially active.

The ethers which are operative in the above method include cyclic ethers such as, for example, tetrahydrofuran, tetrahydropyran and 2-butoxymethyl-tetrahydrofuran and linear ethers having a carbon to oxygen ratio of less than 4:1 and preferably less than 3:1 such as, for example, dimethyl ether, methylethyl ether, the dimethyl ether of ethylene glycol, the diethyl ether of ethylene glycol and the dimethyl ethers of ethylene polyglycols.

The compositions of this invention are of primary importance as intermediates in the preparation of silphenylene compositions of the formula

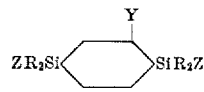

These latter compositions where Z is a functional radical have been especially valuable for preparing silcarbanesiloxane copolymers.

The conversion of the composition intermediates of this invention to the silphenylene structure is accomplished by dehydrogenation following classical procedures such as, for example, heating the intermediate with sulfur at 160° C. or oxygen at 100° C. or reacting the intermediate with quinone at 25° C. This conversion of the intermediate can be combined with the preparation of the intermediate in a two-step method for preparation of the silphenylene compositions.

The following examples are merely illustrative and are not intended to limit this invention, the scope of which is properly delineated in the appended claims.

*Example 1*

A mixture of 234 grams (3 mols) of benzene, 648 grams (6 mols) of $(CH_3)_3SiCl$, 64 grams (9.2 mols) of lithium added as lithium sand and 750 ml. of tetrahydrofuran was stirred for about seven days primarily at room temperature. The reacted mixture was distilled producing a fraction boiling in the range of 84° to 99° C. at 0.3 mm. Hg. This fraction was redistilled producing a fraction boiling in the range of 87° to 90° C. at 4.5 mm. Hg and having a melting point of 50° to 51° C. This fraction was pure

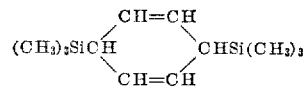

as shown by the infrared spectrum, especially the complete absence in the infrared spectrum of any silphenylene aromatic structure.

*Example 2*

182 grams (1.68 mols) of $(CH_3)_3SiCl$ were added to a mixture of 100 ml. of dry tetrahydrofuran, 39 grams (0.50 mol) of dry benzene and 6.9 grams (1 mol) of lithium wire and stirred for about two days at room temperature. The reaction mixture was filtered and the filtrate distilled yielding a solid boiling at 91° to 93° C. at mm. Hg. Recrystallization of this solid from absolute methanol gave a white solid having a melting point of 41° to 42° C. Elemental anlysis, the nuclear magnetic resonance spectrum and the infrared spectrum showed this solid to be a mixture of about 80 percent by weight I

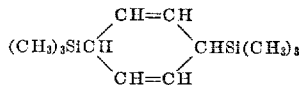

and about 20 percent by weight II

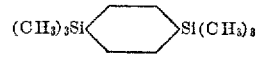

Quinone was added to this mixture causing a black precipitate to appear. The NMR spectrum for I slowly disappeared while the NMR spectrum for II increased. This demonstrated the dehydrogenation of I by quinone and confirmed the interpretation of the initial NMR spectrum.

Example 3

108.5 grams (1 mol) of $(CH_3)_3SiCl$ were added to a mixture of 200 ml. of tetrahydrofuran, 78 grams (1 mol) of benzene, 50.6 grams (2.2 mols) of lump sodium and 50 grams of rock salt (to break up the lump sodium) and stirred for about six days at room temperature. The reaction mixture was filtered and the filtrate distilled yielding as one product a solid boiling at 91° to 93° C. at 4 mm. Hg. The infrared spectrum of this solid showed it to be a mixture of

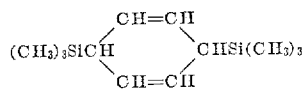

and

Example 4

The experiment of Example 3 was repeated substituting a mixture of 25.3 grams of sodium and about 0.5 gram of lithium wire for the 50.6 grams of sodium. Similar results were obtained with a better yield of products.

Example 5

The experiment of Example 3 was repeated substituting 12.7 grams (0.3 mol) of LiCl for the 50 grams of rock salt and stirring for about 5 days. Similar results were obtained with a better yield of products.

Example 6

91.2 grams (0.84 mol) of $(CH_3)_3SiCl$ were added to a mixture of 43.7 grams (0.56 mol) of benzene, 300 ml. of tetrahydrofuran and about 48 grams of a liquid alloy of the general formula $Na_2K$ and stirred for about five days at room temperature. The reaction mixture was distilled yielding as one product a solid boiling at 91° to 93° C. at 4 mm. Hg. The infrared spectrum of this solid showed it to be a mixture of

and

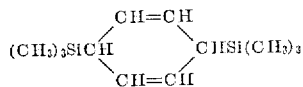

Example 7

Dimethyldichlorosilane and dimethyldimethoxysilane were mixed in an equimolar ratio. After one week neither ingredient was detectable and a single compound $(CH_3)_2Si(OCH_3)Cl$ had been produced according to the infrared spectrum. 251 grams (about 2 mols) of this $(CH_3)_2Si(OCH_3)Cl$ were added slowly to a mixture of 300 ml. of tetrahydrofuran, 78 grams of benzene and 16 grams of lithium added as lithium sand. External cooling was employed to keep the temperature of the mixture in the range of 35° C. to cut down side reactions. This mixture was stirred for 7 days, was filtered and the filtrate distilled to produce a liquid boiling at about 129° C. at about 10 mm. Hg and $n_D^{25.5}$ of 1.473 to 1.474. This was a mixture of primarily

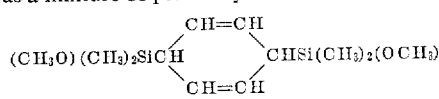

and some

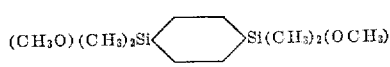

These structures were verified by the diene peak in the infrared spectra and elemental analyses.

Example 8

When 2 mols of $(CH_3)_2SiCl_2$ are substituted for the 2 mols of $(CH_3)_2(OCH_3)Cl$ in Example 7, the product is a mixture containing

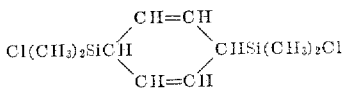

separable by distillation and identifiable by infrared spectra.

Example 9

When 2 mols of $(CH_3)_2SiHCl$ are added slowly to a mixture of 300 ml. of tetrahydrofuran, 78 grams of benzene, 25.3 grams of sodium and about 0.5 gram of lithium wire, the mixture is stirred with cooling to 35° C. for 7 days and filtered, the liquid product is a mixture containing

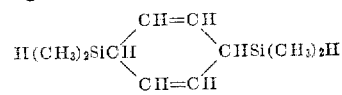

separable by distillation and identifiable by infrared spectra.

Example 10

When cyclohexyloctadecylmethylchlorosilane is substituted mol per mol for the trimethylchlorosilane in Example 1, the principal product is

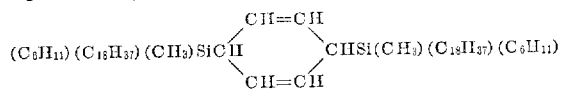

Example 11

216 grams of $(CH_3)_3SiCl$ were added to a mixture of 25 grams of lithium sand (approximately 80% Li), 134 grams of tert-butylbenzene and 300 ml. of tetrahydrofuran, and the mixture was stirred at room temperature for about 20 days. The reaction mixture was filtered and the filtrate distilled to yield

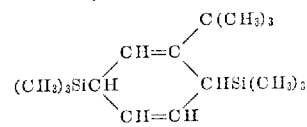

having the following physical properties.

B.P. 96° C. at 1.5 mm. Hg absolute pressure.
$n_D^{25}$ 1.4732.

Example 12

216 grams of $(CH_3)_3SiCl$ were added to a mixture of 25 grams of lithium sand (approximately 80% Li), 92 grams of toluene and 300 ml. of tetrahydrofuran, and the mixture was stirred at room temperature for about 8 days. The reaction mixture was filtered and the filtrate distilled to yield a mixture of 91 percent

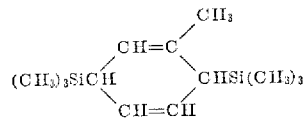

and 9 percent

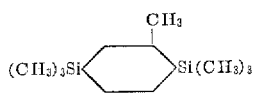

as determined by both infrared spectra and nuclear magnetic resonance spectra.

Example 13

216 grams of $(CH_3)_3SiCl$ were added to a mixture of 17.5 grams of lithium sand (approximately 80% Li), 108 grams anisole and 250 ml. of tetrahydrofuran, and the mixture was stirred at room temperature for about 20 days. The reaction mixture was filtered and the filtrate distilled twice to yield a mixture boiling at 86° to 90° C. at 2 mm. Hg and having $n_D^{25}$ 1.4819 and consisting of

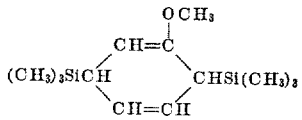

and

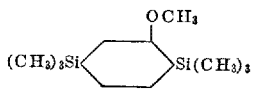

as verified by the infrared spectra.

When n-butoxybenzene is substituted mol per mol for the anisole above, the product is a mixture of

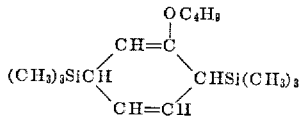

and

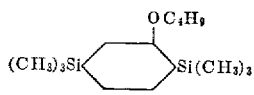

*Example 14*

When 50 grams of the product mixture of Example 7 is stirred with 50 ml. of tetrahydrofuran, 500 ml. of water and 1 ml. of tetrahydrofuran, 500 ml. of water and 1 ml. of glacial acetic acid under an inert atmosphere, two principal products result:

(I)
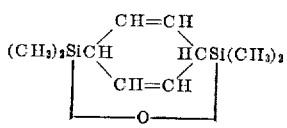

melting at 71.5° to 72° C.

(II)
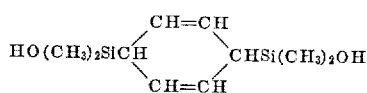

That which is claimed is:

1. A composition of matter of the general formula

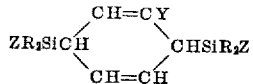

in which each R is a substituent selected from the group consisting of alkyl and cycloalkyl radicals, each Z is a substituent selected from the group consisting of —R radicals, —OR radicals, hydroxyl radicals, hydrogen atoms and halogen atoms and Y is a substituent selected from the group consisting of hydrogen atoms, alkyl radicals of less than about five carbon atoms and alkoxyl radicals of less than about five carbon atoms.

2. A composition of matter of the general formula

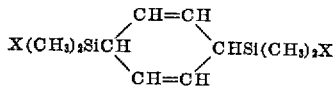

in which each X is a halogen atom.

3. A composition of matter of the general formula

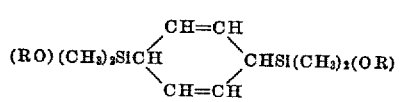

in which each —OR is an alkoxyl radical containing less than five carbon atoms.

4.
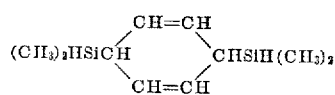

5.
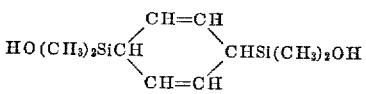

6.
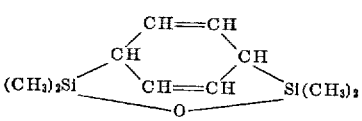

7. The method comprising reacting a silane of the formula SiR₂AX in which A is a substituent selected from the group consisting of —R radicals, —OR radicals, hydrogen atoms and halogen atoms, each R is a substituent selected from the group consisting of alkyl and cycloalkyl radicals and X is a halogen atom with an aromatic compound of the formula C₆H₅Y in which Y is a substituent selected from the group consisting of hydrogen atoms, alkyl radicals of less than five carbon atoms and alkoxyl radicals of less than five carbon atoms, in contact with an alkali metal and an ether selected from the group consisting of cyclic ethers and linear ethers having a carbon to oxygen ratio less than 4:1, said ether being free of aliphatic unsaturation.

8. The method comprising dehydrogenating a composition of the general formula

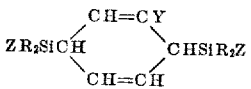

in which each R is a substituent selected from the group consisting of alkyl and cycloalkyl radicals, each Z is a substituent selected from the group consisting of —R radicals, —OR radicals, hydroxyl radicals, hydrogen atoms and halogen atoms and Y is a substituent selected from the group consisting of hydrogen atoms, alkyl radicals of less than about five carbon atoms and alkoxyl radicals of less than about five carbon atoms, whereby a composition of the general formula

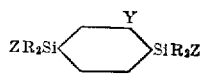

is prepared.

9. The method comprising (1) reacting a silane of the formula SiR₂AX in which A is a substituent selected from the group consisting of —R radicals, —OR radicals, hydrogen atoms and halogen atoms, each R is a substituent selected from the group consisting of alkyl and cycloalkyl radicals and X is a halogen atom with an aromatic compound of the formula C₆H₅Y in which Y is a substituent selected from the group consisting of hydrogen atoms, alkyl radicals of less than five carbon atoms and alkoxyl radicals of less than five carbon atoms, in contact with an alkali metal and an ether selected from the group consisting of cyclic ethers and linear ethers having a carbon to oxygen ratio less than 4:1, said ether being free of aliphatic unsaturation, and (2) dehydrogenating the product from (1) to produce a composition of the general formula

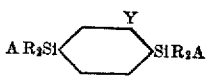

References Cited in the file of this patent

UNITED STATES PATENTS 2,561,429    Sveda ------------------ July 24, 1951

UNITED STATES PATENT OFFICE

CERTIFICATE OF CORRECTION

Patent No. 3,105,085 September 24, 1963

Louis H. Toporcer

It is hereby certified that error appears in the above numbered patent requiring correction and that the said Letters Patent should read as corrected below.

Column 2, line 54, after "at" insert -- 4 --.

Signed and sealed this 10th day of November 1964.

(SEAL)
Attest:

ERNEST W. SWIDER
Attesting Officer

EDWARD J. BRENNER
Commissioner of Patents